United States Patent [19]
Yarnall, Jr. et al.

[11] Patent Number: 5,610,588
[45] Date of Patent: *Mar. 11, 1997

[54] ELECTRONIC CONFINEMENT SYSTEM FOR ANIMALS USING MODULATED RADIO WAVES

[76] Inventors: Robert G. Yarnall, Jr.; Robert G. Yarnall, Sr., both of Ford Rd., P.O. Box 758, Kimberton, Pa. 19442

[ * ] Notice: The term of this patent shall not extend beyond the expiration date of Pat. No. 5,565,850.

[21] Appl. No.: 286,668

[22] Filed: Aug. 5, 1994

[51] Int. Cl.⁶ .................................................. G08B 23/00
[52] U.S. Cl. ........................ 340/573; 119/721; 119/908
[58] Field of Search ............................. 340/573; 119/721, 119/908

[56] References Cited

U.S. PATENT DOCUMENTS

| | | | |
|---|---|---|---|
| 4,208,658 | 6/1980 | Fujiki et al. | 342/70 |
| 4,225,206 | 9/1980 | Roman, Jr. | 439/274 |
| 4,229,724 | 10/1980 | Marcus | 340/988 |
| 4,242,668 | 12/1980 | Herzog | 340/539 |
| 4,297,684 | 10/1981 | Butter | 340/557 |
| 4,371,934 | 2/1983 | Wahl et al. | 364/444 |
| 4,480,310 | 10/1984 | Alvarez | 364/450 |
| 4,656,476 | 4/1987 | Tavitgian | 340/993 |
| 4,733,633 | 3/1988 | Yarnall, Sr. et al. | 340/573 X |
| 4,745,882 | 5/1988 | Yarnall, Sr. et al. | 340/573 X |
| 4,898,120 | 2/1990 | Brose | 340/573 X |
| 4,967,695 | 11/1990 | Giunta | 119/721 |
| 4,996,945 | 3/1991 | Dix, Jr. | 119/721 |
| 5,067,441 | 11/1991 | Weinstein | 340/573 X |
| 5,121,711 | 6/1992 | Aine | 340/573 X |
| 5,161,485 | 11/1992 | McDade | 340/573 X |
| 5,170,149 | 12/1992 | Yarnall, Sr. et al. | 340/573 |
| 5,207,178 | 5/1993 | McDade et al. | 340/573 X |
| 5,241,923 | 9/1993 | Janning | 340/573 X |
| 5,266,944 | 11/1993 | Carroll et al. | 340/573 X |
| 5,425,330 | 6/1995 | Touchton et al. | 119/721 |
| 5,435,271 | 7/1995 | Touchton et al. | 119/721 |
| 5,460,124 | 10/1995 | Grimsley et al. | 340/573 X |

OTHER PUBLICATIONS

"Invisible Fencing" product brochure, 1991.

*Primary Examiner*—Thomas Mullen
*Attorney, Agent, or Firm*—Ratner & Prestia

[57] ABSTRACT

An animal confinement arrangement including a home base for transmitting a modulated signal and a receiver for receiving the modulated signal. The received modulated signal is demodulated using a demodulator. The demodulated signal is compared to a reference signal to produce a comparator signal indicating if the received modulated signal was transmitted by the home base. Also provided is deterrent circuitry which is responsive to a strength level of the received modulated signal and to the comparator signal for producing a deterrent signal which is applied to an animal if the comparator signal indicates that the received modulated signal was transmitted by the home base.

13 Claims, 2 Drawing Sheets

ELECTRONIC CONFINEMENT SYSTEM FOR ANIMALS USING MODULATED RADIO WAVES

FIELD OF THE INVENTION

This invention relates to an electronic confinement arrangement for animals, and more particularly to a wire fence confinement arrangement which utilizes a boundary antenna to transmit a modulated signal to activate a receiver positioned on an animal.

BACKGROUND OF THE INVENTION

One system for accomplishing the confinement of an animal is disclosed in U.S. Pat. No. 5,170,149 entitled CONFINEMENT ARRANGEMENT FOR ANIMALS and issued to Yarnall, Sr. et al. This and other conventional systems mount a receiver on a collar. The collar delivers a shock to an animal wearing the collar when the animal is in relatively close proximity to a perimeter antenna wire. The conventional systems are unintentionally activated, however, by common and naturally occurring sources of unmodulated radio frequencies. These sources include, for example, lightning and household electrical motors such as those motors used in hair dryers and blenders.

Another exemplary conventional system is described in U.S. Pat. No. 4,898,120 entitled ANIMAL TRAINING AND RESTRAINING SYSTEM and issued to Brose. The '120 patent describes a system which includes a transmitter/receiver mounted on an animal's collar for transmitting a series of pulses. A control unit receives the transmitted pulses and provides them to an analog-to-digital (A/D) converter for converting the transmitted pules to digital form based on the amplitude of the received pulses. A central processing unit (CPU) in the control unit uses the digital signals to determine the average strength of the transmitted pulses to determine if the animal has approached a predetermined distance from the transmitter. The system does not distinguish the transmitted signal, however, from naturally occurring and common sources of unmodulated radio frequencies.

The foregoing illustrates the limitations known to exist in present confinement systems. Thus, it is apparent that it would be advantageous to provide an alternative confinement system which will account for common and naturally occurring sources of unmodulated radio frequencies. Accordingly, this is the principal object of the present invention.

SUMMARY OF THE INVENTION

To achieve this and other objects, and in view of its purposes, the present invention provides an animal confinement arrangement including a home base for transmitting a modulated signal and a receiver for receiving the modulated signal. The received modulated signal is demodulated using a demodulator. The demodulated signal is compared to a reference signal to produce a comparator signal indicating whether the received modulated signal was transmitted by the home base. Also provided is deterrent circuitry which is responsive to a strength level of the received modulated signal and to the comparator signal for producing a deterrent signal. The deterrent signal is applied to an animal if the comparator signal indicates that the received modulated signal was transmitted by the home base.

In another exemplary aspect of the present invention, a confinement arrangement including a home base transmitter for transmitting modulated signals is provided. A first wire defines a confinement area and receives and emits a first modulated signal. A second wire within the confinement area and adjacent to the home base receives and emits a second modulated signal. A receiver attached to an animal detects a first, low strength level of the first modulated signal from the first wire and activates deterrent devices on the collar. If the animal continues toward the first wire, the receiver also detects a second, higher strength level of the first modulated signal from the first wire and activates an alarm signal to the home base and disconnects the deterrent circuits. If the animal approaches the second wire, the receiver detects the second modulated signal and reactivates the deterrent circuits, thereby reconfining the animal.

The foregoing and other aspects of the present invention will become apparent from the following detailed description of the invention when considered in conjunction with the accompanying drawing.

DESCRIPTION OF PREFERRED EMBODIMENT AND BEST MODE

In general terms, the confinement system for animals of the present invention operates by transmitting a first, predetermined modulated signal to a receiver mounted on an animal's collar. The modulated signal is demodulated by the receiver and compared to a reference signal. If the demodulated and reference signals are similar, then the signal strength of the first signal is used to determine whether the animal is close to a boundary area. If the modulated and reference signals are not similar, the first signal is ignored.

Figure 1:
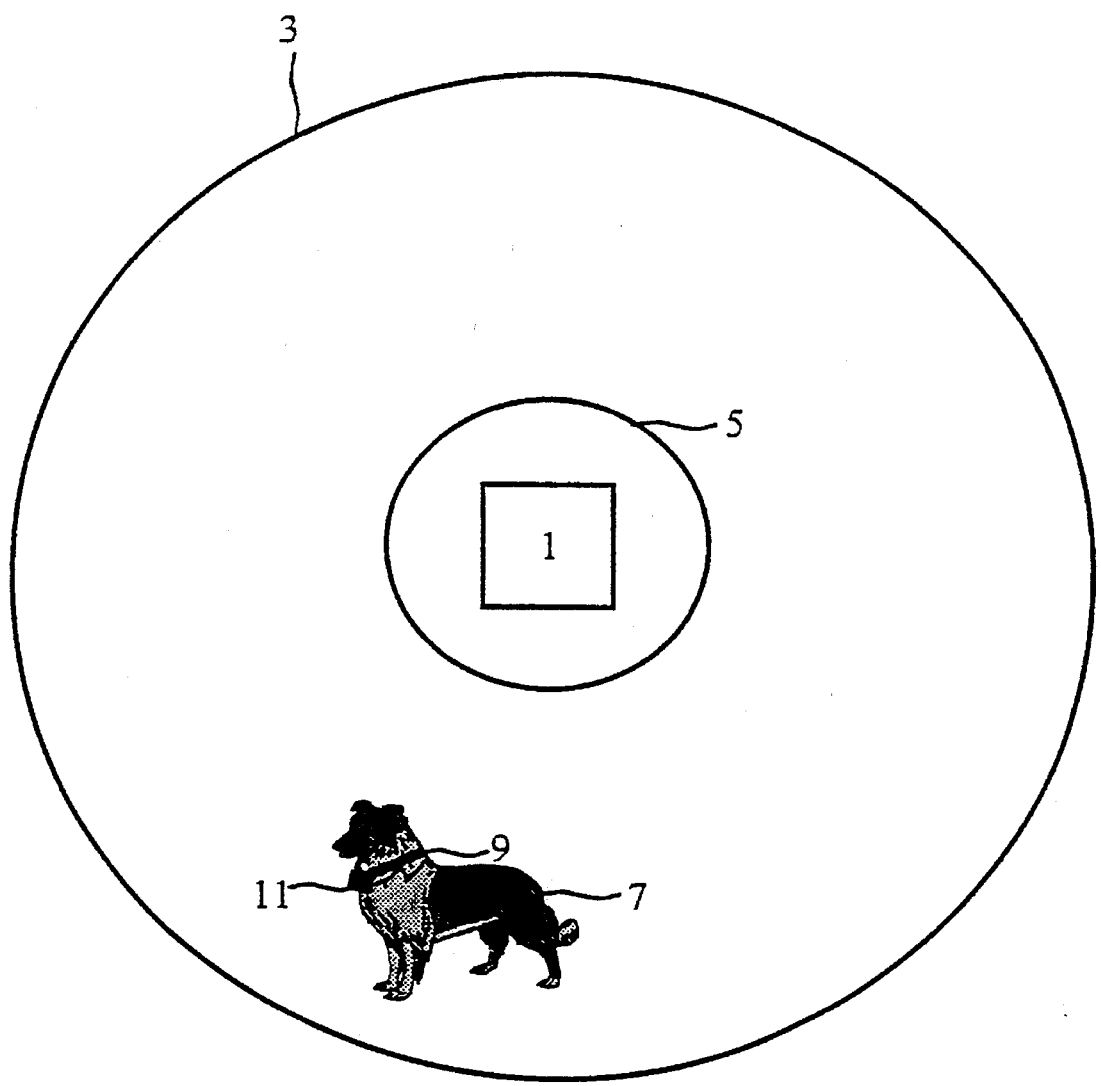
FIG. 1 is a schematic illustration of an exemplary confinement system in accordance with the present invention.

Referring to FIG. 1, there is shown a home base 1 which includes a transmitter for transmitting a first, predetermined modulated signal (A) and a second, predetermined modulated signal (B) which is different from the first, predetermined modulated signal (A). A first signal-emitting wire 3 used to transmit the first signal (A) is disposed around a confinement area. Wire 3 can be above ground or buried under ground.

A second signal-emitting wire 5, used to transmit the second signal (B), is disposed within the confinement area around home base 1. Wire 5 can circle home base 1 or be positioned adjacent to home base 1. Wire 5 can be above ground or buried under ground.

An animal 7 to be kept within the confinement area wears a collar 9 that carries a receiver 11. Receiver 11 is responsive to the first and second signals (A) and (B). First signal (A) is broadcast to wire 3, and is emitted therefrom. The strength of the emitted signal varies with the distance from wire 3, as is well known. As the animal 7 approaches wire 3, the strength of the signal continuously increases and as the animal 7 departs from wire 3 the strength of the signal decreases. Receiver 11 has a deterrent circuit responsive to a first level of strength of signal (A), preferably between 0.001 and 0.005 watts. Once the first level of strength of signal (A) is detected, the deterrent circuit produces a deterrent, including electrical shock and audio, which both act upon the animal to, it is hoped, drive the animal back toward the center of the confinement area.

If the animal 7 ignores the deterrent and continues toward wire 3, the receiver 11 activates its alarm and disconnect circuit. The alarm and disconnect circuit are responsive to a second level of strength of first signal (A), preferably 0.01 to 0.05 watts. After the second strength level of first signal (A) is detected, the disconnect and alarm circuit disconnects the deterrent circuit, so that the animal 7 no longer receives the deterrent, and it may wander outside the confinement area. The term "disconnect" herein refers to an electrical deactivation. Simultaneously with the disconnect, the collar alarm broadcasts an alarm activation signal back to the home base 1, warning the owner that the animal 7 has ignored the deterrent and is escaping.

After the animal 7 escapes, it may desire to return to the home base 1 or to the confinement area, due to habit or due to action of the owner. Collar 9 carries a reconnect circuit responsive to second signal (B). Once the animal 7 approaches wire 5, the reconnect circuit reactivates the disconnected deterrent circuit, and the animal 7 is reconfined.

Figure 2:
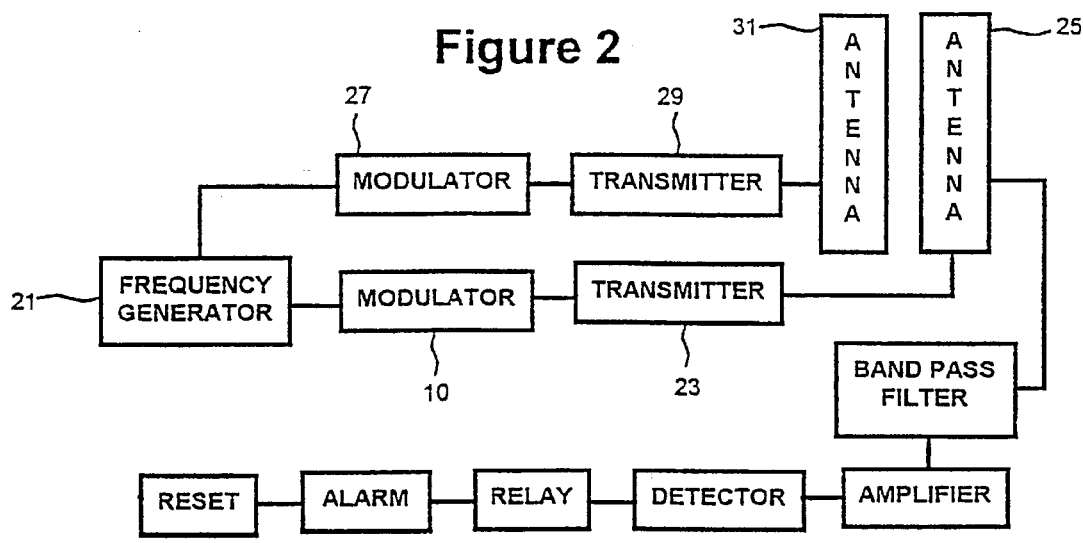
FIG. 2 is an exemplary circuit of a home base transmitter and alarm circuit in accordance with the present invention.

Referring to FIG. 2, an exemplary circuit for home base 1 is shown. The home base is powered by DC electricity. Home base includes frequency generator 21 which generates an oscillating signal of predetermined frequency, for example, 30 KHz. A portion of the output of frequency generator 21 is directed to modulator 27, which shapes the curve of second signal (B), preferably to a square shape, as is well known. Second signal (B) is then transmitted by second transmitter 29 to antenna 31, also referred to herein as wire 5. Wire 5 then emits second signal (B), which is received and processed by the receiver 11 in collar 9, as hereinafter described.

Wire 3 emits first signal (A) which is received and processed by the receiver 11 in collar 9. First signal (A) is a modulated signal which is generated by modulating a carrier signal, for example, the output signal of the frequency generator 21, with a modulating signal which is, for example, an analog signal or a digital signal. Modulated first signal (A) is generated by modulator 10.

As is described later, the modulated signal is demodulated by a demodulator in the receiver 11 in collar 9 and compared to a reference signal to determine if the signal received by the receiver 11 in collar 9 has been transmitted from wire 3. As a result, the receiver 11 in collar 9 can prevent inadvertent activation of the deterrent circuit caused by radio waves generated by common and natural sources as well as signals generated by other confinement systems which are received by the receiver 11 in collar 9.

Modulator 10 can modulate signal (A) using a variety of modulation techniques including, for example, amplitude modulation, frequency modulation, pulse modulation and phase modulation, as are known.

First and second transmitters, 23 and 29, each have means for increasing or decreasing the signal strength, so as to increase the size of the field of transmitted and emitted signals, as is well known.

Figure 3:
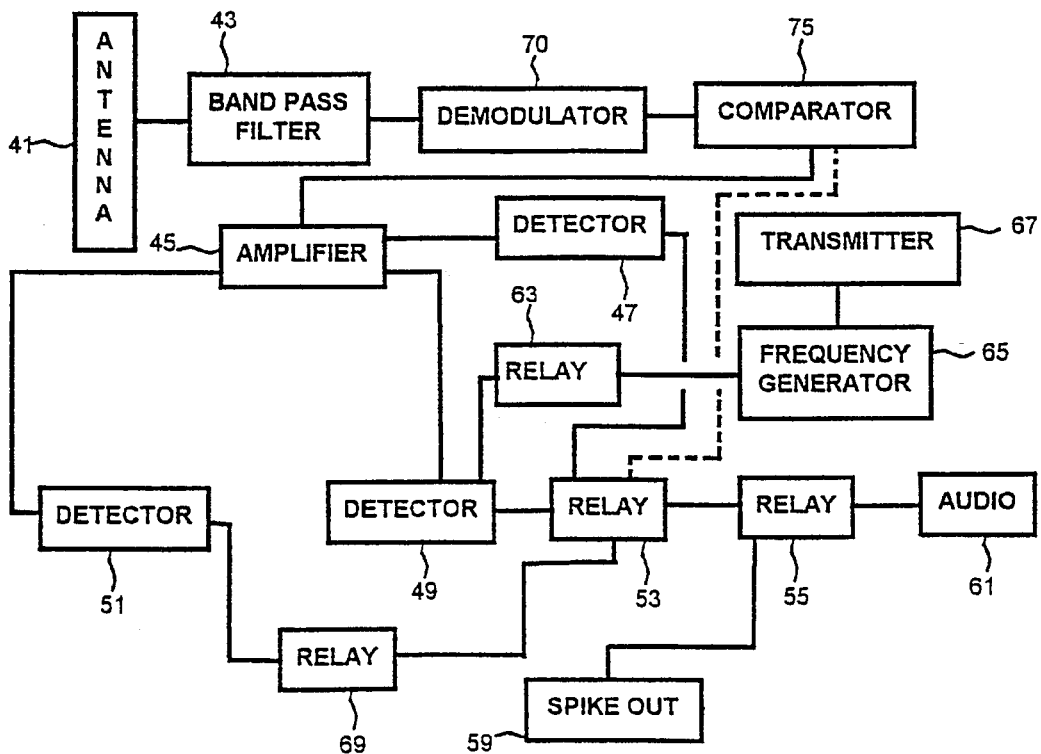
FIG. 3 is an exemplary circuit for a receiver with a deterrent circuit, an alarm circuit, and a deterrent control circuit in accordance with the present invention.

Referring to FIG. 3, an exemplary circuit for the receiver 11 in collar 9 is shown. As the animal 7 nears wire 3, the first strength level signal of modulated first signal (A) is detected by antenna 41 in the receiver 11 in collar 9. First signal (A) passes through a band pass filter 43 that allows only the pre-designated frequency of 30 KHz to pass or frequencies around the pre-designated frequency of 30 KHz to pass. Depending on the selected modulation technique, the frequency of first signal (A) may vary. Accordingly, the band pass filter will be selected to pass frequencies which include the frequency or frequency range of first signal (A).

The output signal of band pass filter 43 is provided to demodulator 70 which demodulates first signal (A) to extract the modulating signal. After signal (A) is demodulated, it is provided to comparator 75 which compares the demodulated signal (A) to a reference signal to determine if the demodulated signal is first signal (A) transmitted by wire 3. If the demodulated signal is the correct signal, then comparator 75 provides first signal (A) to amplifier 45.

If the demodulated signal is not the correct signal, then comparator 75 ignores the input signal for a period of time. After the period of time has elapsed, the comparator compares the currently received signal to the reference signal to determine if the correct signal is received.

Amplifier 45 amplifies first signal (A) up to 100 times, so as to energize the remainder of the circuit. The output of amplifier 45 is divided evenly among detectors 47, 49, and 51. Detector 47 is activated only by modulated signal (A) of a signal strength of between 0.001 and 0.005 watts. This signal level is detected when the animal is still some distance from wire 3. Detectors 49 and 51 are not activated by the first strength level of first signal (A). The output of detector 47 is coupled to first relay 53, which is, in turn, coupled to second relay 55.

Second relay 55 activates an electrical spike circuit 59 and an audio signal circuit 61 to produce an electrical shock and a sound unpleasant to the animal, as is well known. Circuits to produce the electrical shock and audio are well known in the art and are described, for example, in U.S. Pat. No. 4,733,633 entitled ELECTRONIC CONFINEMENT ARRANGEMENT FOR ANIMALS and issued to Yarnall et al., which is incorporated herein by reference.

If animal 7 continues toward wire 3, second strength level of signal (A) is detected by detector 49. Detector 49 is activated only by modulated signal (A) of a signal strength of between 0.01 and 0.05 watts. The output of detector 49 is coupled to third relay 63, which in turn activates frequency generator 65 to broadcast an alarm via transmitter 67, back to home base 1. Frequency generator 65 may be any type of generator capable of generating an oscillating signal at a predetermined frequency, preferably 50 KHz. Detector 49 is also coupled to first relay 53, which then activates second relay 55 to deactivate the electrical and audio circuits, 59 and 61, respectively.

After animal 7 returns to the proximity of second emitting wire 5, detector 51 detects the presence of modulated signal (B). Output of detector 51 acts upon fourth relay 69 to activate first relay 53, which activates the second relay 55, to reactivate the deterrent circuits of electrical shock and audio.

Alternatively, the received signal could be provided directly to amplifier 45. In this case, comparator 75 acts upon the second relay 55 directly or through relay 53 or detector 49 as illustrated by the broken line in FIG. 3, for example, to deactivate the deterrent circuits of electrical shock and audio for a specified period of time if the correct signal is not received.

Although signals (A) and (B) are transmitted at or around 30 KHz, other radio frequencies or bands of frequencies could be used. Likewise, the alarm signal frequency of 50

KHZ could be another frequency. Also, while we have disclosed only a single frequency or band of frequencies for signals (A) and (B), a plurality of individual frequencies or bands of frequencies could be transmitted and received, one frequency or frequency band for a different animal, to make the system workable for a plurality of animals.

In addition, although we have disclosed only a single modulated signal to be demodulated and compared at the receiver 11 of collar 9 for signal (A), a plurality of modulating signals for modulating the carrier signal could be transmitted in signal (A) or from another confinement system and received, one modulating signal corresponding to a different animal, to make the system workable for a plurality of animals.

Finally, although the detectors are activated by first and second strength levels of 0.001/0.005 and 0.01/0.05 watts, other strength levels could be used.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An animal confinement arrangement comprising:

a first signal-emitting wire disposed around a confinement area;

a second signal-emitting wire;

home base transmitting means for transmitting a first modulated signal from the first signal-emitting wire and a second modulated signal from the second signal-emitting wire, the first modulated signal having a first signal strength;

receiver means for receiving any of a plurality of modulated signals including the first modulated signal, as a received modulated signal;

demodulator means for demodulating the received modulated signal to produce a demodulated signal having a second signal strength;

comparator means for comparing the demodulated signal to a reference signal to determine if the received modulated signal was transmitted by the home base transmitting means; and deterrent means, responsive to the second signal strength of the demodulated signal, for producing a deterrent signal which is applied to the animal if the comparator means determines that the received modulated signal was transmitted by the home base transmitting means.

2. The confinement arrangement of claim 1 wherein the first modulated signal is one of an amplitude modulation signal, a frequency modulation signal, and a pulse modulation signal.

3. The confinement arrangement of claim 1 wherein:

the home base transmitting means includes means for generating a carrier signal and a modulating signal, the carrier signal modulated by the modulating signal to produce the first modulated signal;

the demodulator means demodulates the received modulated signal to extract a received modulating signal; and the comparator means compares the extracted received modulating signal to the reference signal to determine whether the received extracted modulating signal was transmitted by the home base transmitting means.

4. The confinement arrangement of claim 1 wherein the receiver means further comprises reconnect means for reactivating the deterrent means in response to the second modulated signal.

5. An animal confinement arrangement comprising:

a) a first signal-emitting wire disposed around a confinement area;

b) a second signal-emitting wire disposed within the confinement area defined by said first signal-emitting wire;

c) a home base transmitting means for transmitting a first modulated signal from the first signal-emitting wire and a second modulated signal from the second signal emitting wire, wherein the second modulated signal is different from said first modulated signal; and d) a receiver responsive to said first modulated signal and said second modulated signal, said receiver including:

(i) deterrent means responsive to a first strength level of said first modulated signal emitted from said first signal-emitting wire for producing as an output a deterrent signal which is applied to an animal, (ii) disconnect means responsive to a second strength level of said first modulated signal emitted from said first signal-emitting wire, said second strength level being higher than said first strength level, said disconnect means producing as an output a signal to disconnect said deterrent means, and (iii) reconnect means responsive to said second modulated signal for producing as an output a signal to reconnect said disconnected deterrent means.

6. The confinement arrangement of claim 5 wherein:

the receiver means receives any of a plurality of modulated signals including the first modulated signal, as a received modulated signal;

the receiver further includes:

(1) demodulator means for demodulating the received modulated signal to produce a demodulated signal; and (2) comparator means for comparing the demodulated signal to a reference signal to produce a comparator signal indicating whether the received modulated signal was transmitted by the home base transmitting means; and the deterrent means produces the deterrent signal if the comparator signal indicates that the received modulated signal is transmitted by the home base transmitting means.

7. The confinement arrangement of claim 5 wherein said deterrent means produces an electrical shock as an output deterrent signal.

8. The confinement arrangement of claim 5 wherein said deterrent means produces an audio signal at a predetermined frequency which is unpleasant to the animal as an output deterrent signal.

9. The confinement arrangement of claim 5 wherein said deterrent means produces both an electrical shock and an audio signal at a predetermined frequency which is unpleasant to at least one animal as an output deterrent signal.

10. The confinement arrangement of claim 5 wherein the home base transmitting means includes:

a) oscillator means for generating oscillating signals and for providing an oscillator output signal;

b) modulator means for modulating said oscillator output signal to produce the first modulated signal; and c) transmitter means for transmitting said first modulated signal.

11. The confinement arrangement of claim 5 wherein:
the receiver further includes:

a) an antenna for receiving the first modulated signal emitted by said first signal-emitting wire;

b) filtering means for passing the received first modulated signal if the received first modulated signal is within a specified frequency range;

c) amplifying means for increasing the signal level of the received first modulated signal to produce an amplified signal;

d) first detecting means, responsive to a first strength level of the amplified signal, for generating a first detector signal;

e) second detecting means, responsive to a second strength level of the amplified signal, for generating a second detector signal;

f) first relay means, responsive to the first detector signal, for one of activating the deterrent means and deactivating the deterrent means;

g) second relay means, responsive to the second detector signal, for producing a relay signal;

h) oscillator means, responsive to the relay signal, for generating an oscillating signal of a predetermined frequency; and i) transmitter means for transmitting the oscillating signal.

12. An animal confinement arrangement comprising:

a first signal-emitting wire forming a boundary line;

a second signal-emitting wire;

home base transmitting means for transmitting a first modulated signal from the first signal-emitting wire and a second modulated signal from the second signal emitting wire;

receiver means for receiving any of a plurality of modulated signals including the first modulated signal, as a received modulated signal;

demodulator means for demodulating the received modulated signal to produce a demodulated signal, the demodulated signal having a strength level;

comparator means for determining if the received modulated signal was transmitted from the home base transmitting means; and deterrent means, responsive to the comparator means and the strength level of the demodulated signal, for producing a deterrent signal which is applied to an animal if the received modulated signal was transmitted by the home base transmitting means.

13. The confinement arrangement of claim 12 further comprising reconnect means for reactivating the deterrent means in response to the second modulated signal.

* * * * *

UNITED STATES PATENT AND TRADE MARK OFFICE
CERTIFICATE OF CORRECTION

PATENT NO.   : 5,610,588
DATED        : March 11, 1997
INVENTOR(S)  : Yarnall, Jr. et al.

It is certified that error appears in the above-identified patent and that said Letters Patent is hereby corrected as shown below:

On the cover page, item [56] References Cited, Other Publications, after "product brochure," insert --Cover Sheet and pg. 5--.

Column 1, line 35, delete "pules" and insert therefor --pulses--.

Signed and Sealed this

Twenty-eighth Day of October, 1997

Attest:

BRUCE LEHMAN

*Attesting Officer*      *Commissioner of Patents and Trademarks*